(12) United States Patent
Rege et al.

(10) Patent No.: US 6,895,468 B2
(45) Date of Patent: May 17, 2005

(54) LOG-STRUCTURED BLOCK SYSTEM AND METHOD

(75) Inventors: Satish L. Rege, Minneapolis, MN (US); Dave Aune, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 303 days.

(21) Appl. No.: 10/060,015

(22) Filed: Jan. 29, 2002

(65) Prior Publication Data

US 2002/0103983 A1 Aug. 1, 2002

Related U.S. Application Data

(60) Provisional application No. 60/264,891, filed on Jan. 29, 2001.

(51) Int. Cl.[7] .............................................. G06F 12/16
(52) U.S. Cl. .............................. 711/114; 711/6; 711/5; 711/8
(58) Field of Search ................................. 711/4, 5, 111, 711/112, 114; 714/5, 6, 7, 8, 52, 54

(56) References Cited

U.S. PATENT DOCUMENTS

| | | | |
|---|---|---|---|
| 2,628,346 A | 2/1953 | Burkhart | |
| 3,761,903 A | 9/1973 | Bird, Jr. et al. | |
| 4,750,106 A | 6/1988 | Aiken, Jr. | |
| 5,237,466 A | 8/1993 | Glaser et al. | |
| 5,341,361 A | 8/1994 | Hosaka | |
| 5,499,253 A | * 3/1996 | Lary | 714/770 |
| 5,630,104 A | 5/1997 | Ottesen et al. | |
| 5,724,539 A | 3/1998 | Riggle et al. | |
| 5,799,324 A | 8/1998 | McNutt et al. | |
| 6,018,790 A | 1/2000 | Itoh et al. | |
| 6,061,194 A | 5/2000 | Bailey | |
| 6,070,225 A | 5/2000 | Cheung et al. | |
| 6,101,615 A | * 8/2000 | Lyons | 714/6 |
| 6,163,422 A | 12/2000 | Blumenau | |
| 6,353,895 B1 | * 3/2002 | Stephenson | 714/5 |

OTHER PUBLICATIONS

Rosch, Winn L. The Winn L. Rosch Hardware Bible, 3rd ed. Sams Publishing, 1994. p. 999.*

* cited by examiner

Primary Examiner—B. James Peikari
(74) Attorney, Agent, or Firm—Westman, Champlin & Kelly, P.A.; T. Fronek

(57) ABSTRACT

A log-structured block system is provided in which writing log-structured data is done. Subsequently, data mirroring is done. In addition, a data storage system for implementing the log-structured block system is provided.

23 Claims, 5 Drawing Sheets

LOG-STRUCTURED BLOCK SYSTEM AND METHOD

CROSS REFERENCE TO RELATED APPLICATIONS

This application claims the benefit of U.S. Provisional Application No. 60/264,891, filed Jan. 29, 2001.

FIELD OF THE INVENTION

The present invention relates generally to data storage arrays. More particularly, the present invention relates to a log-structured block system within a data storage array.

BACKGROUND OF THE INVENTION

Data mirroring is a common technique used to ensure reliability in data storage arrays. In a typical storage array that employs data mirroring, the mirroring is accomplished by writing the information at two different locations. Some prior art systems write the information 180° out of phase on the same disc; thus, reducing the capacity of the drive by at least half. On the other hand, some prior art systems write the data from one disc drive onto a second disc drive in the array; this method requires having a second drive for every first drive in the array. These prior art systems require twice as many of the number of drives in an array to meet the non-mirrored design requirements. Consequently, the prior art designs are expensive and inefficient solutions.

Further, in the prior art systems described above, the host has to wait until the array controller can give confirmation that both of the data locations have been written. While both of these writes may be performed at the same time, the simultaneous writing of both sets of data to two different locations is an inefficient process.

The prior art data mirroring systems fail to solve all of the problems associated with mirroring an array of drives. Therefore, a need exists for a solution to the problem of providing data mirroring at a more efficient rate and lower cost. More specifically, a need exists for a solution to the problem of mirroring fast input/output drives, while reducing the cost incurred in mirroring without decreasing the system performance.

The present invention provides a solution to this and other problems, and offers other advantages over the prior art.

SUMMARY OF THE INVENTION

The present invention relates to data storage systems that have log-structured block capabilities which solve the above-mentioned problems.

In accordance with one embodiment of the invention, a log-structured data writing method is provided in which logs are created. Subsequently the logs are written to a data storage medium. In addition, the invention also can be implemented as a log-structured block system itself.

In accordance with a another embodiment of the present invention, a data mirroring method is provided in which a mirror of data is created based on log-structured data. In addition, the invention also can be implemented as a data storage system.

These and various other features as well as advantages which characterize the present invention will be apparent upon reading of the following detailed description and review of the associated drawings.

DETAILED DESCRIPTION

Figure 1:
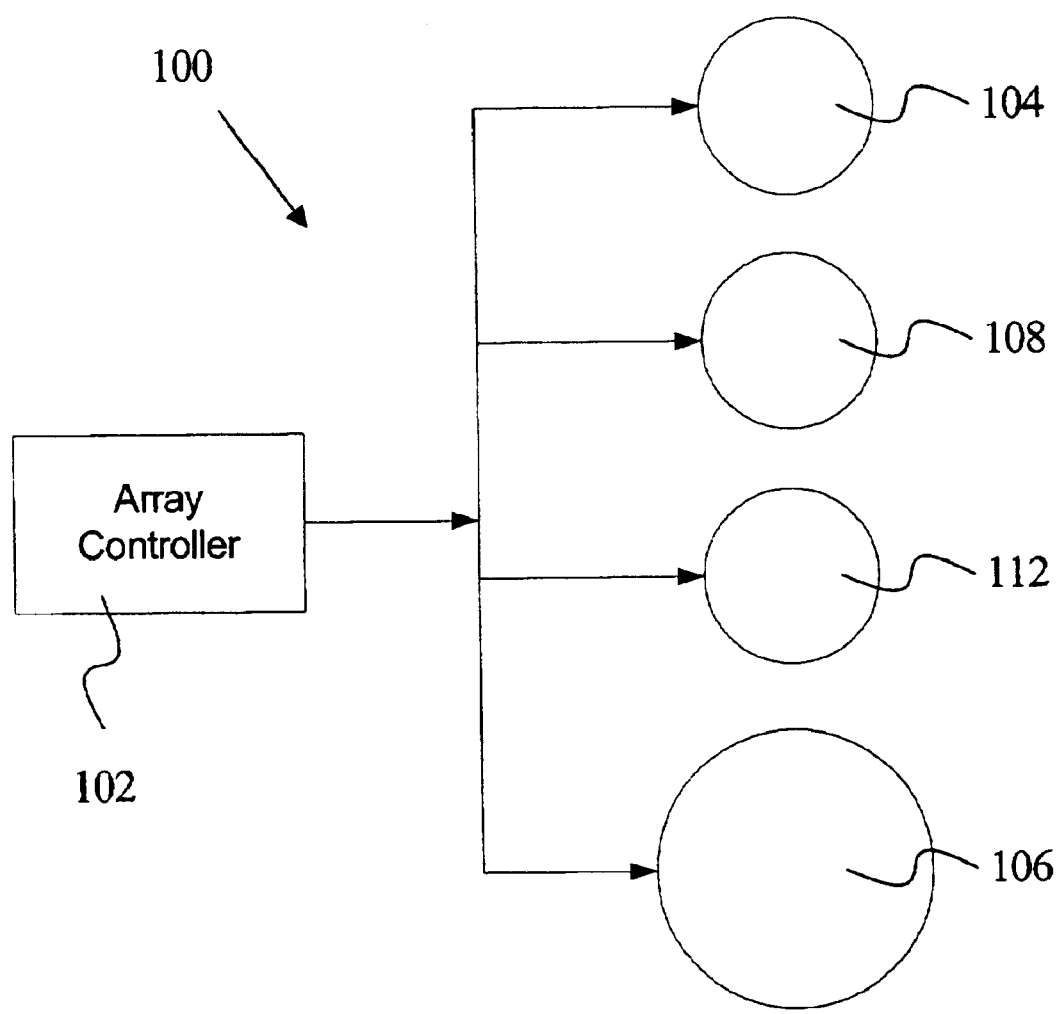
FIG. 1 is a block diagram of a disc drive array implementing a preferred embodiment of the present invention.

Referring now to FIG. 1, a data storage array 100 is shown. A system, like the one shown in FIG. 1 includes an array controller 102, comparatively low capacity disc drives 104, 108, 112 and a comparatively high capacity disc drive 106. Array controller 102 contains a processor (not shown), memory (not shown), host and disc interfaces (not shown). Array controller 102 buffers the data to be mirrored and creates the control information necessary to mirror the data. Typically, the low capacity drives 104 will have a high input/output (I/O) rate and consequently high cost per megabyte. An example of a drive that provides a high I/O rate is a multi-actuator disc drive. The I/O rate is mostly dependent on the number of write or read requests the drives receive. Further, high capacity disc drive 106 will have a comparatively lower I/O rate and lower cost per megabyte than the low capacity disc drives 104. Preferably, the write requests are mirrored simultaneously by one of the methods listed below. Whichever method is used, the data is eventually written on the low I/O, high capacity drive 106. The write requests that are initially written on the high capacity drive 106 are written by a log-structured data writing method described below, the log-structured data writing being done in a sequential fashion. Thus, mirrored data from drive 104 may be followed by data from drive 108 or 112.

In a data storage array 100, write requests make up typically 25% to 50% of the total I/O requests. While the high I/O rate drives 104, 108, and 112 perform read requests, the high capacity drive 106 is enabled to perform housekeeping work to effectively move the sequentially written log-structured data to organized locations that are dedicated to be logical mirrors of drives 104, 108, and 112. The low number of write requests to the data storage array 100 will allow the high capacity, low I/O rate disc drive 106 the ability to move the mirrored data that was sequentially stored. Thus, in a preferred embodiment, a log-structured block system can provide a solution to allow a number of comparatively high I/O rate, small capacity drives 104, 108 and 112 to be mirrored onto a comparatively slower I/O rate, high capacity drive 106.

Figure 2:
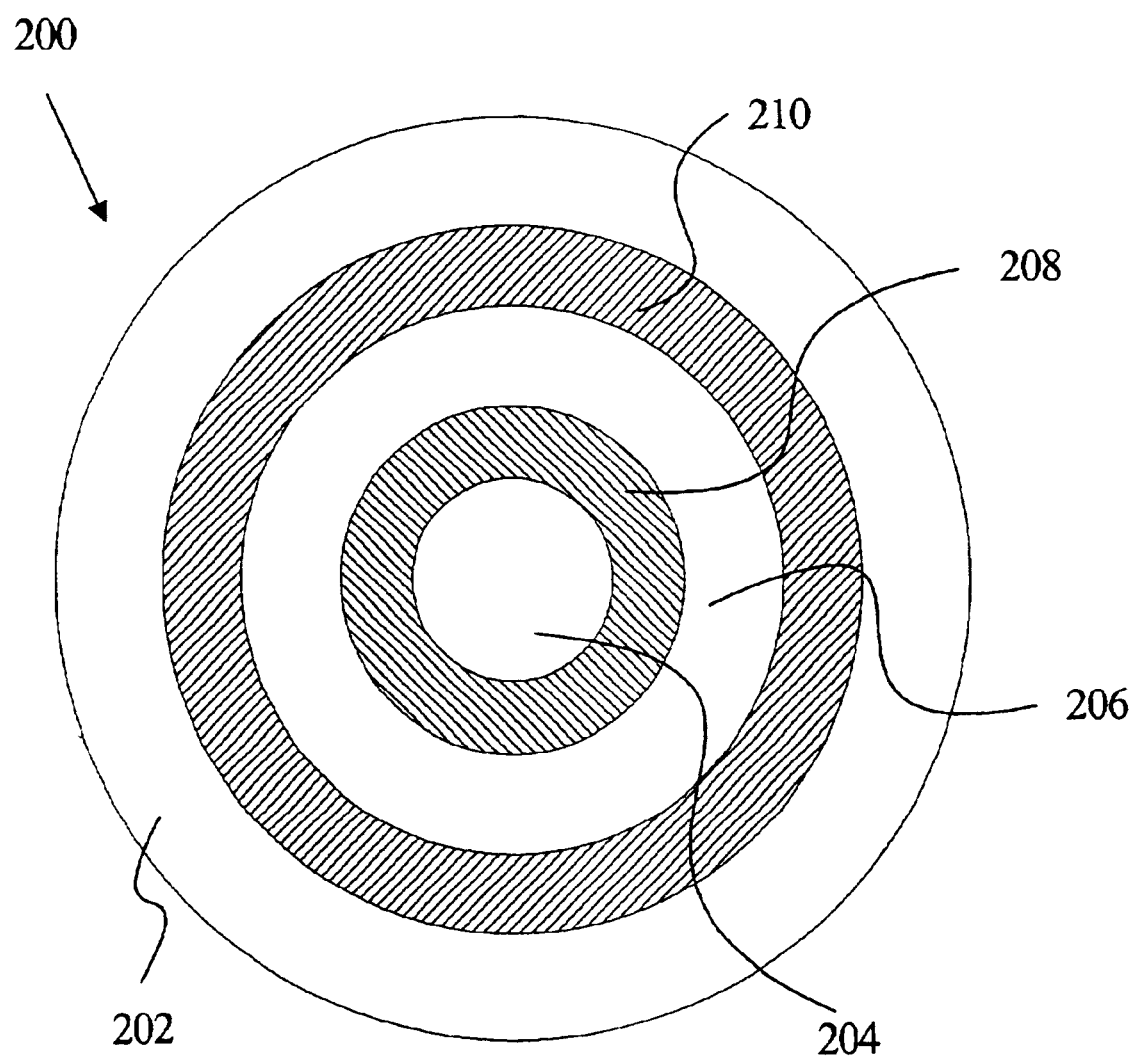
FIG. 2 is a mapping diagram of a preferred embodiment disc drive which can be used in the system shown in FIG. 1.

FIG. 2 is a diagram of a disc 200 intended to be a representation of the data layout of the preferred embodiment high capacity disc drive 106. Information is written to and read from tracks (not shown) on the disc 200 through the use of a transducer (not shown). The disc 200 includes an inner data zone 204 and an outer data zone 202 that can be used to mirror data from a first and second data source. A data source may consist of a disc drive, CD-ROM, ROM, RAM, a plurality of disc drives, etc. The disc 200 may be divided into as many data zones as deemed necessary by the design requirements of the data sources that will be mirrored. The disc 200 also includes areas 206, 208, 210 for writing log-structures. Preferably, inner data zone 204 and outer data zone 202 have the same data capacities as the two data sources that they mirror. The capacity for the log-structure areas 206, 208, 210 is a design variable that is chosen based on the characteristics of the system environment and the required optimizations. The log-structure areas 206, 208, 210 are located between the data zones 202 and 204 to minimize the movement between the actuator arms (not shown) and the data zones 202 and 204. Log-structure areas 208 and 210 may be used as data buffers to ensure that there is enough space available for the log-structures being written. The log-structure areas 208 and 210 may be combined into log-structure area 206 to make a larger area for storing the sequentially written log-structured data.

Figure 3:
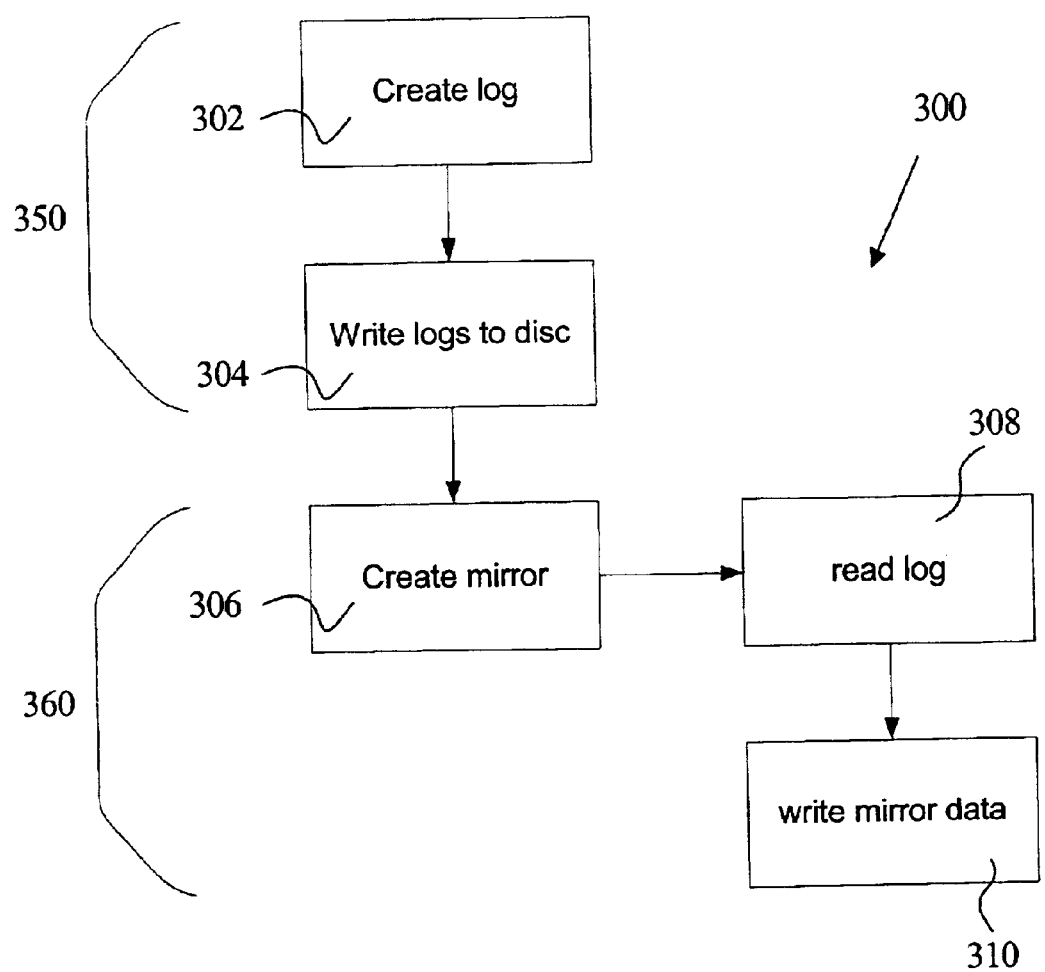
FIG. 3 is a flowchart detailing an embodiment of a log-structured data writing method and a data mirroring method.

FIG. 3 illustrates a flowchart of two methods, the first method 350 for writing log-structured data and the second method 360 for mirroring data, both methods in accordance with embodiments of the present invention. The illustrated methods are usually represented as algorithms inside a controller such as controller 102. The controller 102 processes read and write commands for the low capacity, high I/O drives. When a write command is initiated, the controller 102 processes log-structured mirroring algorithm 300, which is a combination of the first method 350 for writing log-structured data and the second method 360 for mirroring data.

The log-structured mirroring algorithm 300 is based on log-structured block system (LSBS) concepts that are derived from the ideas used in log-structure file systems. Log-structure file systems write all files sequentially to a log on the disk drive. This improves both write performance and crash recovery. File reads are performed by properly indexing the logs. Cleaning operations that follow are used to throw away old data and logs that are of no value to recover disc space. A similar system can be used to create a high capacity log-structured disc drive. In the following description, a LSBS and associated mirroring methods are described.

Figure 4:
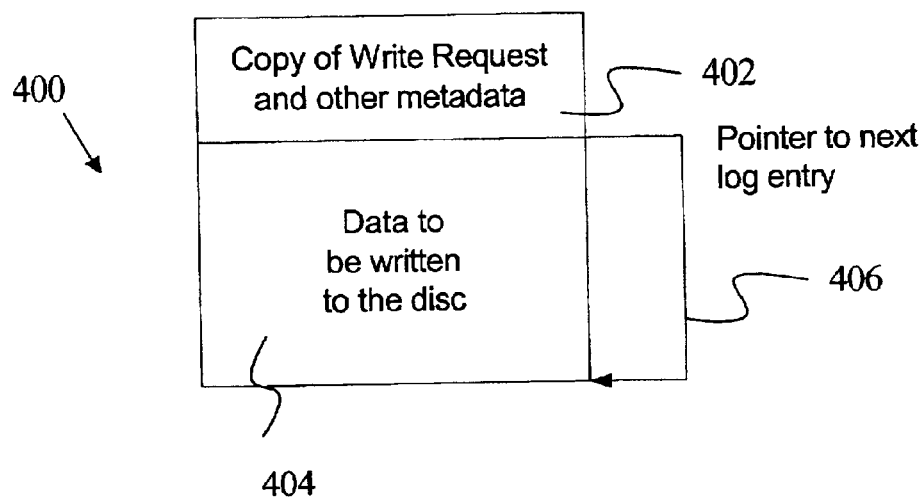
FIG. 4 is a diagram of a memory log which can be used in the system shown in FIG. 1.

When a write command is received, the controller 102 creates a log in the memory, step 302. FIG. 4 shows a simple memory log 400. The memory log 400 consists of a header 402 that contains the write request and other metadata. An example of metadata is a pointer 406 to the next write request. There may be other metadata such as write time (not shown). The pointer 406 is necessary because the amount of data 404 to be written to the disc 106 may have various lengths, thus the header and the data have a complete set of information to create a mirrored copy.

Figure 5:
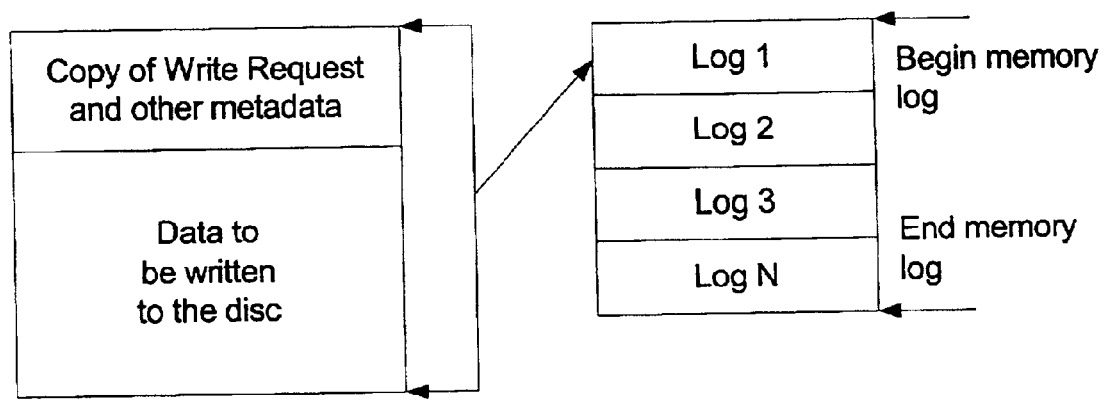
FIG. 5 is a diagram of a sequence of memory logs which can be used in the system shown in FIG. 1.

A number of memory logs 400 may be created in the memory before they are written to the disc 106. These memory logs 400 may be sequentially written in the memory (not shown) as shown in FIG. 5 or they may be written in a scatter gather manner if large blocks of sequential memory are not to be used for logs 400. Whichever write method is chosen, it is important to know the sequence in which the writes arrive and write them to the disc 106 in the same order. Writing the memory logs 400 sequentially to the high capacity drive 106 is faster than random writes. This should allow the high capacity drive 106 time to keep up with the low capacity drives, especially during the times when burst writes occur.

After the log is created in the memory, the controller 102 writes the log, step 304, to the high capacity disc drive 106. This may be done once a sufficient number of logs 400 are accumulated. Preferably, the logs 400 are written 304 when there is enough data so that one whole track can be written in one write operation. Such a method may require a non-volatile memory (not shown) for storing the logs until the write 304 to protect against data loss from power failure. This write to the high capacity disc 106 is preferably done as a sequential write. The amount of logs 400 being written 304 is a design choice of the system and many variations may be available, such as writing 304 when many tracks of data can be written.

Next, the mirror is created, step 306. Creating the mirror 306 is an independent process from creating the log(s) 302 and writing the log(s) 304. Thus, step 306 may be replaced by another operation such as restarting the method 350 or stopping the log writing method 350 until more writes are received.

Preferably, data mirroring method 360 has two operations. First, the logs 400 are read 308 from the high capacity disc 106 during light usage. This may be a sequential read operation performed during a time of low activity of read or write requests. Next, the mirror is created 310 on the high capacity disc 106. This is done by parsing each log entry 400 to decide what data zone and logical block number the data is to be written to on the high capacity disc drive 106. The information used to create the mirror of each log is stored in the log itself, usually as metadata 402. The metadata 402 includes information on where the log data 404 should be written respective of the location the corresponding data on the high I/O, low capacity drives. The information about where the log should be written is important because it specifies which high I/O disc drive the data belongs to and also the location, or logical block number, of the data on the corresponding high I/O disc drive. This information is useful, in step 306, to determine the appropriate location to write the mirrored data.

Finally, a write request is scheduled with the disc drive 106 to complete the mirroring. The data is usually written to the high capacity drive 106 by a random write operation. Generally, there will be a track seek operation before writing data to the disc 106 for each log entry 400.

Creating a memory log 302, writing the log 304, and creating a mirror 306 may all be done in parallel by the controller 102. Further, the controller 102 can perform other processes in parallel with the data mirroring processes. For example, the controller may parse incoming Command Data Blocks and send operations to the low capacity, high I/O rate drives 104. There are various software techniques and data structures that are well known in the industry that can be used to schedule, parallelize, and optimize these operations.

Figure 6:
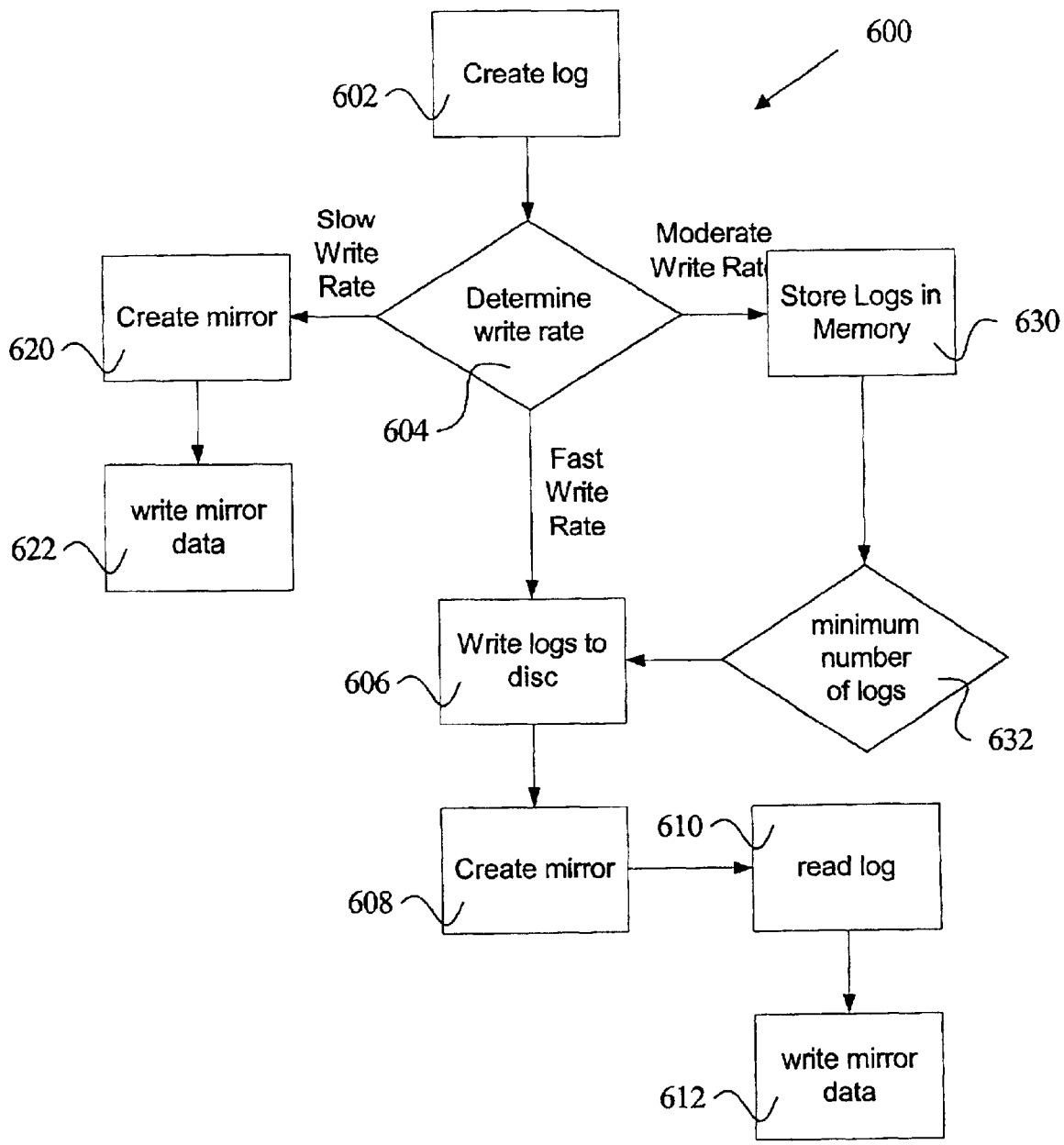
FIG. 6 is a flowchart detailing a preferred embodiment data mirroring method.

FIG. 6 illustrates a flowchart of a method for mirroring data in accordance with a preferred embodiment of the present invention. The above data mirroring method 600 recognizes three different situations and optimizes for each of them. These situations are (i) when writes are arriving extremely slow, (ii) when writes are arriving at a moderate rate, and (iii) when writes are arriving at a very fast rate.

The controller 102 determines which of the three optimizations it will perform based on monitoring the write rate 604. The rate at which the writes are arriving can be determined by comparing the number of writes over time to the I/O properties of the high capacity, low I/O drive 106 for various operations such as sequential writes and random writes. One method of determining the rate at which writes are arriving is to monitor the available capacity of the memory. As the memory is filled, the rate at which the writes are arriving may be high. If the memory is filling gradually, the rate at which the memory is arriving may be moderate and if the memory is being filled slowly, then the rate at which the writes are arriving may be low.

If the writes are arriving fast, the data mirroring algorithm 300 of FIG. 3 is performed in the corresponding steps 606, 608, 610, 612. Thus, there will not be much time to perform many functions other than creating the log, step 602, in memory and writing the logs, step 606, to the high capacity disc drive 106.

If the writes are arriving slowly, then priority should be given to reading logs 610 from the disc drive 106 and writing the mirror data 612. If there are no logs 400 present on the disc drive 106, creating the disc mirror 620 should be done by writing the mirror data 622 directly from memory (not shown) without doing the writing of the logs 606, or the reading the logs 610.

If the writes are arriving at a moderate rate, the logs 400 should be accumulated 630 in the memory (not shown) while other logs 400 are simultaneously read 610 from the high capacity disc drive 106 and written to create the data mirror 612. When a minimum amount of logs 400 are accumulated, the logs 400 are written 606. This is preferably done when there is enough data so that one whole track can be written in one write operation. The write 606 to the high capacity disc 106 is preferably done as a sequential write. When the logs 400 are written 606 is a design choice of the system and many variations may be available, such as writing 606 when many tracks of data can be written.

The amount of space (sectors and tracks) available in the areas 206, 208, 210 for writing log-structures will have to be determined for the performance of an individual system. The rate at which the writes arrive have to be balanced over time so that the logs 400 can be mirrored 608 and the areas 206, 208, 210 for writing log-structures on the disc drive 106 do not get consumed.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage array while maintaining substantially the same functionality without departing from the scope and spirit of the present invention. In addition, although the preferred embodiment described herein is directed to log structured mirroring for a data storage system, it will be appreciated by those skilled in the art that the teachings of the present invention can be applied to other systems, like single drive mirroring systems, without departing from the scope and spirit of the present invention.

What is claimed is:

1. A data mirroring method, comprising steps of:
   creating a log in memory, the log having a header containing a write request and metadata, the metadata including a pointer to a next write request;
   writing one or more logs to a disc drive, the disc drive formatted in such a way as to provide a specific area for writing logs; and
   creating a mirror of data based on information stored in the area for writing logs.

2. The method of claim 1 wherein creating a mirror comprises reading the logs from the log area of the disc drive and writing the logs to a specific disc mirror area of a disc array.

3. The method of claim 1 wherein creating a mirror further comprises parsing each log to decide where data stored in the log is to be written on the disc array.

4. The method of claim 1 wherein creating a log in memory consists of creating a sequence of logs in memory.

5. The method of claim 4 wherein writing one or more logs to a disc drive comprises writing a sequence of logs to the disc drive.

6. A data storage system, comprising:
   (a) at least one first disc drive;
   (b) at least one second disc drive; and
   (c) a controller, operatively coupled to the at least one first disc drive and the at least one second disc drive, to perform a method of mirroring data, wherein the method of mirroring data comprises
      creating a log in memory, the log having a header containing a write request and metadata, the metadata including a pointer to a next write request;
      writing one or more logs to the at least one second disc drive, the at least one second disc drive formatted in such a way as to provide a specific area for writing logs; and
      creating a mirror of data based on information stored in the area for writing logs.

7. The data storage system of claim 6 wherein the controller further comprises reading the logs from the log area of the at least one second disc drive and writing the logs to a specific area designated for mirroring a specific one of the at least one disc drive.

8. The data storage system of claim 6 wherein creating a log in memory consists of creating a sequence of logs in memory.

9. The data storage system of claim 6 wherein writing one or more logs to a disc drive comprises writing a sequence of logs to the disc drive.

10. The data storage system of claim 6 wherein the at least one first disc drive further comprises an array of disc drives.

11. The data storage system of claim 10 wherein the at least one second disc drive is formatted in such a way as to provide specific areas for mirroring the data of each one of the disc drives in the array.

12. The data storage system of claim 6 wherein the at least one second disc drive further comprises two disc drives, one disc drive for storing the logs and a second disc drive for mirroring data.

13. A log-structured block system comprising:
   a source of data;
   a controller, enabled to read the source of data, for creating logs containing a block of data and a header, the header including a pointer to a next log;
   a memory buffer, operatively coupled to the controller, for storing the logs; and
   a data storage medium, operatively coupled to the memory buffer, for writing the logs from the memory buffer, the data storage medium being a different data storage medium from where the source of data is located.

14. The log-structured block system of claim 13, wherein the header further comprises location specific information about a specific block of data.

15. The log-structured block system of claim 13, wherein the logs comprise a sequence of logs.

16. The log-structure block system of claim 13, wherein the data storage medium comprises a hard disc drive.

17. The log-structured block system of claim 13, wherein the data storage medium further comprises a writing mechanism for writing a sequence of logs as a sequential operation.

18. The log-structured block system of claim 13, wherein the data storage medium further comprises a controller enabled to reorganize the data in the logs to create an exact logical mirror of the data source based on data location information stored in the header.

19. A log-structured data writing method, comprising steps of:
obtaining information to be stored as metadata;
creating at least one log from a data source by pairing the metadata for a specific data location with a copy of the data from the same data location, the log further including a pointer to a next log;
storing the at least one log in memory; and
writing the at least one log to a data storage medium that is different than the data source.

20. The log-structured data writing method of claim 19, wherein the metadata comprises location specific information about a specific block of data.

21. The log-structured data writing method of claim 19, further comprising storing a sequence of logs in memory.

22. The log-structure data writing method of claim 19, wherein the data storage medium comprises a hard disc drive.

23. The log-structured data writing method of claim 19, further comprising reorganize the data in the logs to create an exact logical mirror of the data source based on data location information stored in the header.

* * * * *